United States Patent [19]
Nofel

[11] 4,216,363
[45] Aug. 5, 1980

[54] HANDLE SAFETY SWITCH
[75] Inventor: Thomas J. Nofel, Brookpark, Ohio
[73] Assignee: MTD Products Inc., Cleveland, Ohio
[21] Appl. No.: 931,844
[22] Filed: Aug. 7, 1978

Related U.S. Application Data
[62] Division of Ser. No. 812,178, Jul. 1, 1977, Pat. No. 4,161,639.

[51] Int. Cl.² ...................... H01H 13/08; H01H 1/50
[52] U.S. Cl. .................................... 200/157; 200/250
[58] Field of Search ..................... 200/61.85, 243, 250, 200/303, 334, 157, 245, 247, 290, 239; 180/19 R; 123/198 DC

[56] References Cited
U.S. PATENT DOCUMENTS

| | | | |
|---|---|---|---|
| 962,989 | 6/1910 | Stevens | 200/157 |
| 2,128,916 | 9/1938 | Cox | 200/61.57 X |
| 2,614,194 | 10/1952 | Lester | 200/159 R |
| 3,942,604 | 3/1976 | Black | 200/157 X |
| 3,980,068 | 9/1976 | Karsten et al. | 200/157 X |
| 4,161,639 | 7/1979 | Nofel | 200/157 |

*Primary Examiner*—Steven M. Pollard
*Attorney, Agent, or Firm*—Woodling, Krost & Rust

[57] ABSTRACT

A safety switch mechanism mounted on the handle of a power driven appliance such as a snow-thrower, lawn mower, garden tiller and the like having a motor or engine mounted thereon, the operator walking behind the appliance for holding a backwardly extending handle, the switch mechanism being adapted to short out or ground the electrical circuit of the motor or engine, or alternatively to open the contacts of a solenoid connected in series with the energizing circuit of an electric motor so as to stop the operation of the same upon the operator discontinuing to grasp the switch mechanism on the handle. This is an abstract only of the specific illustration of the invention given by way of example and is not to be used in the interpretation of the claims nor as a limitation on the scope of the invention.

6 Claims, 8 Drawing Figures

HANDLE SAFETY SWITCH

This is a division, of application Ser. No. 812,178 filed July 1, 1977, now U.S. Pat. No. 4,161,639.

An object of the invention is to lend safety in the operation of a power driven appliance, such as a snow-thrower, lawn mower, garden tiller and the like having a motor or engine mounted on the appliance.

It is an object of my invention to assure that upon the operator of the appliance releasing his grasp upon the portion of the handle normally held by the operator walking behind the appliance, the operation of the motor or engine of the appliance will terminate.

Another object is to assure that the switch mechanism mounted on the handle of such a power driven appliance will cause the motor or engine of the appliance to stop operating unless the switch mechanism is grasped at least some place along the length of the portion of the handle normally held by the operator.

A still further object in one form of the invention is the provision of an elongated hand grasping member housing a normally closed switch for controlling the operation of a motor or engine, constructed to provide that the switch is maintained to keep closed an electrical circuit unless the hand grasping member is grasped at least at some location along its length.

Another object in a modified form of the invention is the provision of an elongated hand grasping member housing a normally open switch for controlling the operation of an electric motor, constructed to provide that the switch is maintained open unless the hand grasping member is grasped at least at some location along its length, the said switch being connected in series with a control solenoid circuit which controls the completion of the circuit carrying the energizing current of the electric motor.

Other objects and a fuller understanding of this invention may be had by referring to the following description and claims, taken in conjunction with the accompanying drawings in which:

Figure 1:
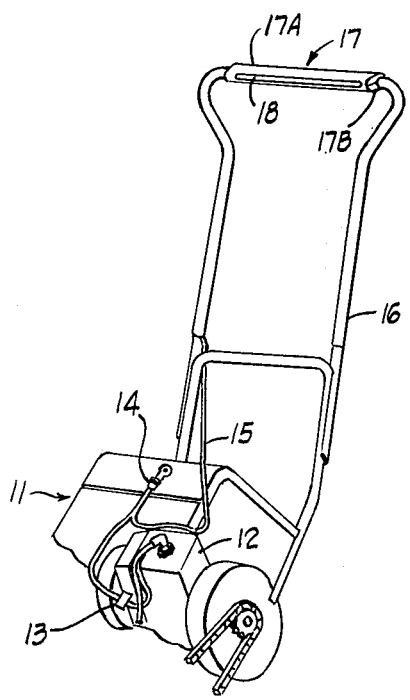
FIG. 1 is a perspective view of a power driven appliance such as a snow-thrower, lawn mower, garden tiller or the like, and to which my invention is applied.
Figure 3:
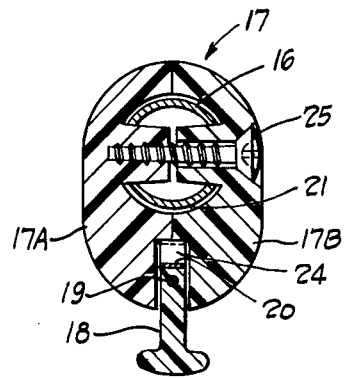
FIG. 3 is an enlarged cross-sectional view taken through the line 3—3 of FIG. 2.
Figure 2:
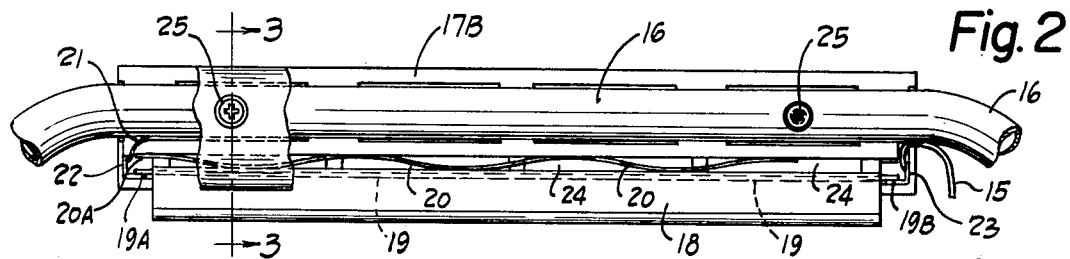
FIG. 2 is a longitudinal cross-sectional view of the hand grasping portion embodying my switch mechanism and applied to the portion of the appliance handle normally grasped or held by the operator, and in which the switch is resiliently held in closed position at both of its opposite ends.
Figure 4:
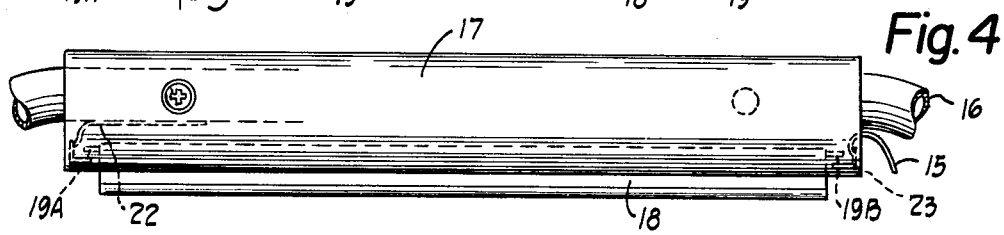
FIG. 4 is a top view of the hand grasping member embodying my improved switch mechanism and showing the mechanism operated so that the contacts are open at both of the opposite ends of the switch mechanism.
Figure 5:
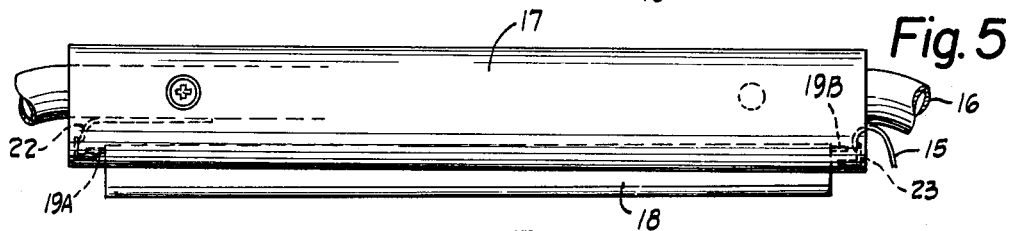
FIG. 5 is a view similar to that of FIG. 4 but in which the contacts at one of the opposite ends of the switch mechanism are closed and at the other of the opposite ends are opened.
Figure 6:
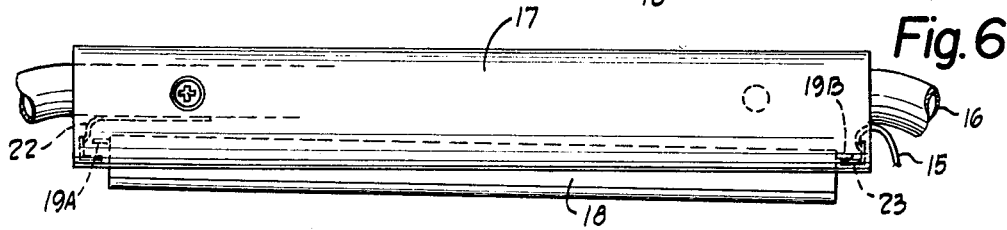
FIG. 6 is a view similar to that of FIG. 4 but in which the contacts at one of the opposite ends of the mechanism are opened, while at the other of the opposite ends the contacts are closed.

In FIG. 2 the upper portion of the hand grasping member has largely been removed to disclose the details of the switch mechanism mounted within the hand grasping member. In FIGS. 4, 5 and 6, the hand grasping member is enclosed and the internal switch mechanism parts are shown in phantom. In FIG. 1 it is shown that the hand grasping member, which is an elongated member, is mounted on the transverse portion of the appliance handle which is normally held by the operator walking behind the appliance in its forward travel.

The appliance to which my invention is mounted may be a power driven snow-thrower, lawn mower, garden tiller or the like which is driven by an internal combustion engine or an electric motor. Such appliances usually have rearwardly extending handles held by the operator who walks behind the appliance as it moves forwardly.

In the drawing, the power driven appliance is generally denoted by the reference character 11. A motor or engine 12 is mounted upon the appliance in the well known manner to drive the appliance and operating parts carried thereby. In the instance illustrated, the motor or engine 12 is an internal combustion engine having an ignition system including a magneto. Upon shorting out or grounding the ignition system of the engine 12, the engine is stopped and the appliance is no longer driven. The connection of the grounding circuit to the engine is indicated by the reference character 13. Leading from this connection 13 is an insulated wire 15 which goes through a key operated switch 14 in the usual manner. The wire 15 extends upwardly and is encased in a plastic sheath enclosing the upper exposed portion of the handle 16 extending rearwardly from the appliance.

The handle 16 has a bight extending transversely relative to the direction of the mower travel and which bight is normally held by the operator of the appliance. Mounted upon this transverse bight of the handle is a hand grasping member 17. This member 17 is of suitable molded plastic material of electric insulating material. It is comprised of two mating parts 17A and 17B and extends along the transverse bight of the handle as illustrated. The two parts 17A and 17B are held together by screws 25 which extend through suitably provided openings in the bight of the handle 16 whereby the hand grasping member 17 is firmly secured to the handle bight.

Along the forward and lower portion of the member 17 there is provided a long recess or groove 24 extending along most, but not all, of the length of the member 17. Positioned in this long recess or groove 24 is a bar 18 also of plastic electrically insulating material. This bar 18 extends outwardly so as to be engaged by the hand of the operator grasping the member 17. Extending through the length of the bar 18 is a conducting member 19 which protrudes from the opposite ends of the bar 18 to have end portions 19A and 19B protruding therefrom. At one end of the member 17, such as at the left-hand end in FIGS. 2, 4, 5 and 6, there is electrically contacting member 22 mounted in fixed position therein. This electric contacting member 22 is electrically connected to the metal handle 16 within the member 17 by a small wire 21 which is disposed along and is pressed against the bare metal of the handle 16 within the member 17 whereby the contact member 22 is grounded or electrically connected with the handle 16 and the metal frame of the appliance 11 and engine 12.

At the opposite end of the member 17, such as at the right-hand end in FIGS. 2, 4, 5 and 6, there is mounted in fixed position an electrically contacting member 23. This fixed electric contact member 23 is electrically connected with the wire 15 which, as shown in Figure extends down to the magneto connection 13 of the engine 12. Thus, at one end of the member 17 the contact member 22 is grounded and at the other end of the member 17, the contact member 23 is connected to the grounding circuit through wire 15 to the magneto connection 13.

Mounted within the long recess or groove 24 formed within the two mating halves 17A and 17B is a spring of wave form. It is so resiliently biased that it tends to assume the wavy form illustrated in FIG. 2. As noted in this Figure, there are three locations of engagement of the spring 20 with the inner edge of the bar 18. There are also three locations of engagement of the spring 20 with the back wall of the recess 24. The locations of the engagement of the spring with the bar 18 and the locations of the engagement of the spring 20 with the back wall of the recess 24 against which the spring is pressed are out of phase with each other as illustrated.

The left-hand end of the spring 20 is anchored or held in the position shown by a small nitch or recess formed in the opposite mating halves 17A and 17B. As seen in FIG. 2, this end is at the left-hand end of the member 17 whereby this left-hand end of the spring 20 is held against the rear wall of the recess within the member 17. As this nitch is small and coincides with the dimension of the spring at the left-hand end, the nitch itself is not discernible in the view of FIG. 2. The right-hand end of the spring 20 in FIG. 2 is free so that the right-hand end may slide longitudinally as the spring is compressed by the bar 18 moved inwardly of the member, that is rearwardly of the appliance as it moves forwardly.

The bias of the spring 20 is such that upon the operator seizing with a hand the member 17 so as to press the bar 18 inwardly of the member 17, that is rearwardly in respect to forward motion of the appliance, the bar 18 is permitted to move and to carry with it conducting member 19 and protruding ends 19A and 19B. When the handle is not held so that the operator's hand moves the bar 18 rearwardly, or inwardly of the member 17, then the bar 18 is held out from the member 17 by the resilient force of the spring 20. When the member 17 is not so grasped as to move the bar rearwardly into the member 17, then the parts are in the relative position illustrated in FIG. 2. Here it will be seen that protruding end 19A of the conducting member 19 engages the contact member 22 and also the protruding end 19B of conducting member 19 electrically engages the contact member 23 at the right-hand end in FIG. 2.

In this condition of the parts shown in FIG. 2, there is a complete circuit between ground and the magneto connection whereby the engine or motor 12 can not operate because the circuit is grounded out. Thus, in the unattended condition of the appliance wherein the operator is not holding in one or both hands the member 17 so as to press the bar 18 inwardly, the engine can not be started, or if it is already operating, the engine will be stopped. Thus the safety of the operator is assured because the appliance can not be operated unless and until the operator is behind the handle and holding the hand grasping member 17 so as to press the bar 18 inwardly.

Upon the bar being pressed inwardly of the member 17 so that there is substantial equilibrium in the force of moving the opposite ends of the bar 18 inwardly, then the parts will be in the position illustrated in FIG. 4. Here both contacts in the opposite ends of the hand grasping member 17 are opened and the grounding circuit is opened so that the engine may be operated. It is noted here by the phantom lines that the protruding ends 19A and 19B are spaced from the contacting members 22 and 23, respectively, so that the grounding circuit is broken at two different locations. This would be normally the situation where the operator so grasps the member 17 as to so press the bar 18 inwardly to move both ends of the bar 18 to the position shown in FIG. 4.

In FIG. 5 there is illustrated the relationship of the parts as the member 17 is so grasped as to press inwardly the bar 18 only at one of the opposite ends of the member 17 such as at the right-hand end illustrated in FIG. 5. In this situation the bias of the spring is such that the grounding circuit is broken at this one end of the member 17, that is, the right-hand end in FIG. 5, but the grounding circuit remains closed at the left-hand end shown in FIG. 5. Thus, the grounding circuit will be opened so as to be ineffective and not to stop or limit the operation of the engine if the bar 18 is moved only to the limited extent shown in FIG. 5.

In FIG. 6 it is assumed that the operator has so grasped the handle 17 as to move the bar at the left-hand end of FIG. 6 inwardly of the member 17 so as to move the protruding end 19A out of contact with the contacting member 22 while at the same time the protruding end 19B remains in contact with the contacting member 23 at the right-hand end shown in FIG. 6. Here again, the grounding circuit is opened at only one location but this is enough to keep the grounding circuit from being effective and to permit the engine to operate.

it is thus seen that the switch mechanism is effective whether the bar is moved rearwardly as in FIG. 4 and in which the bar 18 is kept parallel with the member 17, or is effective when the bar is tilted as illustrated in FIG. 5, or is tilted in an opposite menner as illustrated in FIG. 6. As long as the operator moves the bar 18 rearwardly, that is inwardly of the member 17, into positions of either FIGS. 4, 5 or 6, the grounding circuit will be broken or opened so as to be ineffective and the motor or engine may operate without it being grounded. However, if the handle 18 is not moved inwardly of the member 17 by the operator so as to be completely pressed forwardly to the position shown in FIG. 2, then the grounding circuit is closed at two locations and the engine is effectively grounded at the magneto connection 13.

Figure 7:
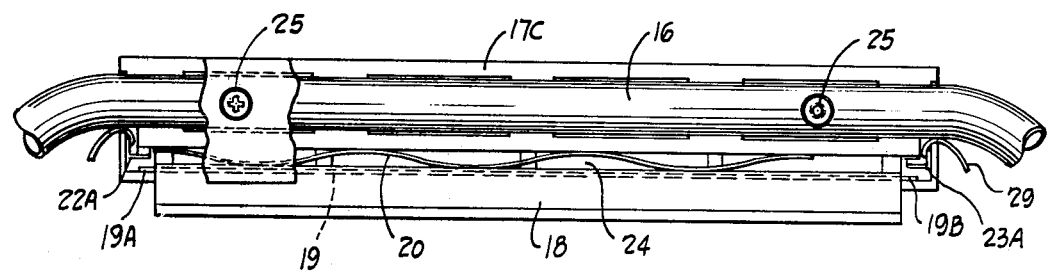
FIG. 7 is a view somewhat similar to that of FIG. 2 but showing a modified arrangement in which the electric contact members are so located and arranged that the switch mechanism is normally open.
Figure 8:
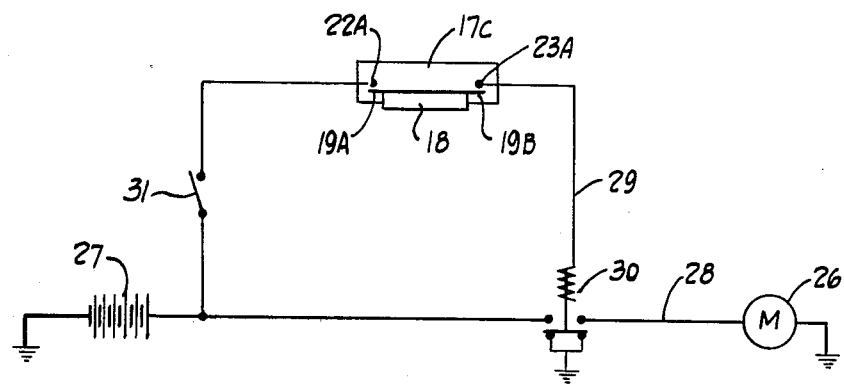
FIG. 8 is a circuit diagram showing the application of the normally open switch mechanism shown in FIG. 7 to an appliance having an electric motor for driving the same.

In the modified form of my invention illustrated in FIGS. 7 and 8, the hand grasping member 17C is similar to the preferred form of member 17 illustrated in FIGS. 1-6, except that the switch mechanism within the member 17C is normally open when the member 17C is not grasped and the bar 18 moved inwardly by the hand of the operator.

In this modified form of the invention, the form and positions of the electric contact members are changed so that in FIG. 7 contact member 22 is here designated as 22A and contact member 23 is here designated as 23A. These contact members 22A and 23A are connected in series in the control circuit 29 as illustrated in FIG. 8. The spring 20 resiliently holds the end portions 19A and 19B of conducting member 19 away from, that is out of electrical engagement with, the contact members 22A and 23A, respectively.

The modified form of the invention is particularly adapted for use in controlling the operation of an electric motor which may be mounted on an appliance, such as a snow-thrower, lawn mower, garden tiller, or the like, for driving the same. FIG. 8 is a diagrammatic view showing such a modified member 17C connected in series with a control circuit for opening and closing the circuit carrying the main electric current that energizes the electric motor 26.

A battery 27, or other suitable course of electric current such as house current, supplies the main electric current for energizing the motor 26 through conducting cable 28. A controlling electric circuit 29 is electrically connected to the battery 27 and to a solenoid switching device 30 which is connected to cable 28 between battery 27 and motor 26 so as to control the flow of current between the battery 27 and motor 26 through the cable 28. When the solenoid switching device 30 is in opened position, current supply to the motor 26 is interrupted and the operation of the motor terminates.

A key-operated switch 31 is connected in series in the control circuit 29 as shown in FIG. 8. Also the modified hand grasping member 17C containing the normally open switch mechanism, including contact members 22A and 23A, is connected in series in the control circuit 29.

Upon the member 17C being grasped by the operator to press the bar 18 inwardly to complete a connection between contacts 22A and 23A (assuming the key operated switch has been closed by the key) the control circuit 29 is completed. This operates the solenoid operated switch 30 which closes that switch to complete and maintain the circuit through cable 28 between battery 27 and electric motor 26. The motor 26 is thus energized and operates.

Upon the release of the member 17C by the operator of the appliance, then the switch mechanism within the member 17C resumes its normally open condition and the solenoid in solenoid switching device 30 is no longer energized and the switching device 30, biased to open position, is opened and the supply of current through the cable 28 to the motor 26 from battery 27 is terminated. The motor 26 then causes to operate because the member 17C is no longer grasped by the operator so as to hold the bar 18 inwardly. Upon both ends of bar 18 of the modified switch mechanism in the member 17C being held inwardly by the operator pressing the whole bar 18 inwardly, the control circuit 29 is completed and the solenoid switching device 30 is closed to cause current to flow from the battery 27 to the motor 26 which is then energized.

It will be seen that this modified form of the invention is thus well adapted for controlling the operation of an electric motor.

It will be seen that considerable safety is assured by the application of my invention to such appliance as power driven snow-throwers, lawn mowers, garden tillers and the like.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electric switch having a first portion and a second portion disposed alongside each other, a strip spring of wave form interposed between said first and second portions and biased to resiliently urge the second portion bodily away from the first portion, said spring having a plurality of bearing surfaces spaced apart longitudinally of said first and second portions to permit tilting of the second portion relative to the first portion to move either end of the second portion to be disposed at an angle to the first portion and also to permit both ends of the second portion to move simultaneously relative to the first portion, the said first and second portions carrying spaced electrical contacting means adjacent their opposite ends, and said second portion carrying electric conducting means, the said electrical contacting means and said electric conducting means being adapted to complete an electric circuit, the movement of both ends of the said second portion simultaneously towards said first portion breaking the electric engagement of said electric contact means at both of the said opposite ends of the first and second portions, to interrupt said circuit, and the movement of one end of said second portion toward said first portion a distance more than any movement of the other end of the second portion toward said first portion breaking the engagement of the electric contacting means at least one of said opposite ends of the first and second portions.

2. An electric switch as claimed in claim 1 and in which said electric contacting means carried by the first and second portions at the opposite ends thereof also provides mechanical limit means to limit movement of the second portion away from said first portion.

3. An electric switch as claimed in claim 1 and in which the electric contacting means at each end of the first and second portions has a fixed part carried by the first portion and a second part carried by the second portion and movable with the second portion into and out of electric engagement with said first part of the electric contacting means.

4. An electric switch having a first portion and a second portion disposed alongside each other, a spring interposed between said first and second portions and biased to resiliently urge the second portion away from the first portion, said first and second portions carrying spaced electrical contacting means adjacent their opposite ends, said second portion carrying electric conducting means, the said electrical means and said electric conducting means being adapted to complete an electric current, said electrical contacting means being arranged so that the said contacting means are normally held disengaged and said electric circuit open by the resilient urging by said spring of the said second portion away from said first portion, the movement of said second portion against the resilient bias of said spring closing said electric circuit, said spring being a strip spring is undulating wave form positioned between said first and second portions and having a plurality of bearing surfaces spaced apart longitudinally of the first and second portions to permit tilting of the second portion relative to the first portion and to permit the second portion to move bodily relative to said first portion and thereby allowing selective engagement and dis-engagement of the contacting means at both or at only one of said opposite ends.

5. An electric switch as claimed in claim 4 and in which said electrical circuit is connected to a solenoid switching device connected in series in a cable between a source of electric energy and an electric motor for controlling the flow of current through the cable between said source and said motor in accordance with the actuation of the solenoid switching device in accordance with the closing and opening of said electric switch, the said electrical contacting means at the said opposite ends being biased normally open by said spring and said electrical circuit being completed only by electrically engaging the electrical contacting means at both of said opposite ends by moving the said second portion bodily toward the said first portion.

6. A normally open switch mounted on the portion of the elongated handle of an appliance normally held by the operator of the appliance, circuit means connecting said switch to a solenoid to actuate the solenoid, means connecting said solenoid in series between a source of electric current and an electric motor to control the flow of current from the source of current to the electric motor that drives the appliance, said switch being normally held open by a strip spring of undulating wave form having a plurality of bearing surfaces engaging said handle at locations spaced longitudinally of the spring being biased to hold the switch open at a plurality of locations spaced longitudinally of the handle and being adapted to complete the circuit means upon the simultaneous closing of the switch at both of said spaced locations.

* * * * *